March 24, 1925. 1,530,651
M. Q. CORBETT
INFLATION TUBE COUPLING
Filed April 11, 1923 2 Sheets-Sheet 2
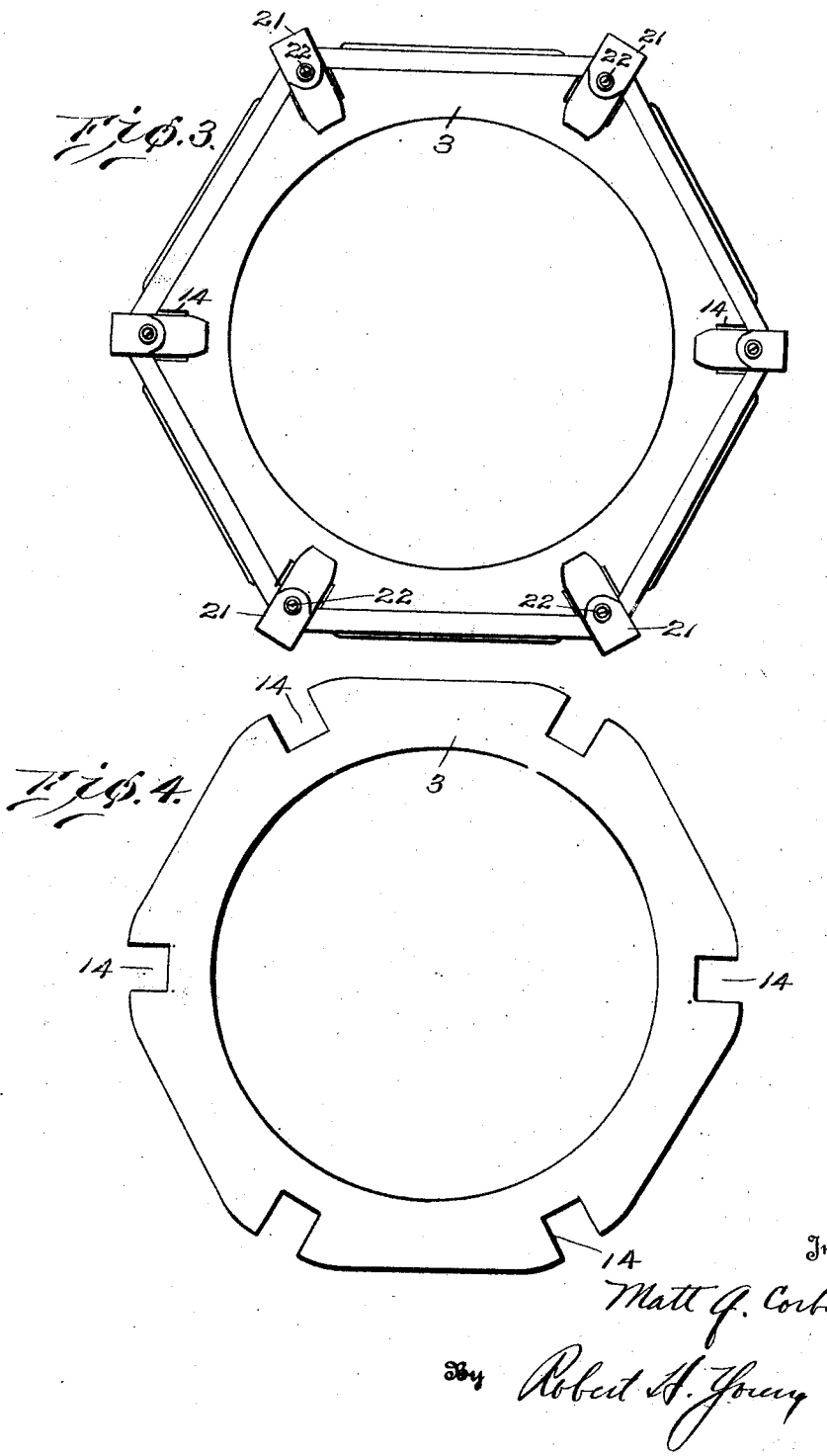

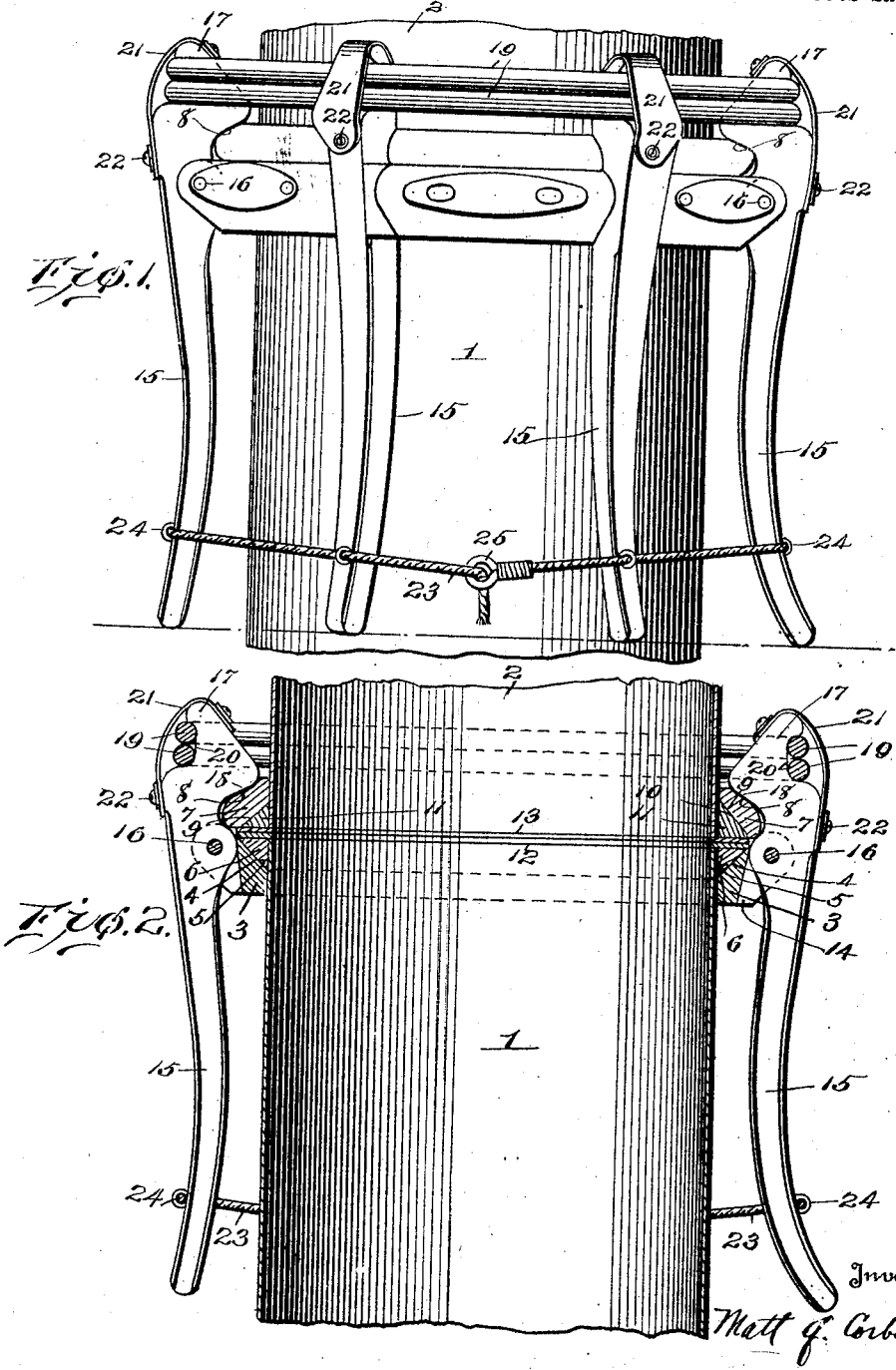

Patented Mar. 24, 1925.

1,530,651

UNITED STATES PATENT OFFICE.

MATT Q. CORBETT, OF DAYTON, OHIO.

INFLATION-TUBE COUPLING.

Application filed April 11, 1923. Serial No. 631,332.

*To all whom it may concern:*

Be it known that I, MATT Q. CORBETT, a citizen of the United States, residing at Dayton, in the county of Montgomery and State of Ohio, have invented certain new and useful Improvements in Inflation-Tube Couplings, of which the following is a specification.

This invention relates to means for coupling together with a fluid tight joint or connection the adjacent ends of two flexible tubes.

In lighter than air aircraft employing aerostats or gas bags or envelopes, it is necessary to connect the gas supply tube to the intake tube of the gas bag and this must be done in such manner as to provide a gas tight connection, coupling or joint between the adjacent ends of the tubes in order to prevent leakage of gas.

The object of the present invention is to provide a coupling of the type referred to which will effect a considerable saving in the time required to inflate a gas bag. From a military standpoint it would seem desirable that all possible time be saved in making and breaking the gas tube connections in both airships and observation balloons and the like.

With the above and other objects in view, the invention consists in the novel construction, combination and arrangement herein fully described, shown and claimed.

In the accompanying drawings.

Figure 1 is a side elevation of the improved coupling or joint shown applied to the adjacent ends of tubes.

Figure 2 is a diametrical section through the same.

Figure 3 is a plan view of the collar and the parts attached thereto.

Figure 4 is a plan view of the collar per se.

In the drawings 1 and 2 designate tube ends. The tube used for inflating gas bags is usually composed of closely woven fabric, usually rubberized and made perfectly fluid or gas tight. The sections of such tube are usually quite thin and of light weight, thereby rendering it somewhat difficult to so temporarily connect the adjacent ends of the sections of the tube as to provide a gas tight joint.

In carrying out the present invention I provide in connection with one of the tube ends such as the tube section 1, an annular collar 3 having a beveled face 4, which lies directly opposite the beveled face 5 of a seat forming ring 6. The edge portion of the tube end 1 is firmly clamped between the collar 3 and the ring 6, all of said parts 3, 1 and 6 being firmly united together as by cement or mechanical fastening means as may be found most expedient in practice.

Surrounding the other tube end 2 is a cam ring 7, the cam face of which is indicated at 8. The ring 7, like the collar 3, is provided with a beveled face 9 which lies opposite to the corresponding beveled face 10 of another seat forming ring 11, corresponding in shape with the shape of the ring 5 but disposed reversely thereto. The edge portion of the tube end 2 is firmly clamped and held between the cam ring 7 and the seat forming ring 11 and said parts are firmly united together by cement or mechanical fastening means. Flat faces of the seat forming rings 6 and 11 lie opposite each other and in the preferred embodiment of the invention gaskets 12 and 13 are united to said adjacent flat faces of the seat forming rings as clearly shown in Figure 2. The gaskets 12 and 13 may be formed of felt or any suitable material so that when they are pressed tightly together a perfectly gas tight joint is formed.

The collar 3 is formed in the periphery thereof and at any suitable number of intervals with notches 14 and in each of said notches there is placed a clamping lever 15 mounted on a pivot 16, whereby a pivotal connection is established between the clamping lever 15 and the collar 3. Each clamping lever 15 is provided with a head 17 which forms a clamping jaw, said jaw being formed with a cam-face 18 which is adapted to ride against or on the cam face 8 of the ring 7 so that as the clamping jaws of the several clamping levers are forced inwardly they simultaneously ride against the cam ring 7 and force the seat rings 3 and 6 tightly together.

The clamping levers 15 are held in clamping position by resilient means shown in the form of one or more elastic cords 19 which embrace the clamping jaws of all the levers as shown in Figures 1 and 2, the levers being formed with recesses 20 to receive said cords and the cords being held in place by means of retaining straps 21, which are fastened to the clamping jaws as shown at 22. By means of the elastic cord or cords 19 the clamping jaws are resiliently held in clamping position.

In order to provide for simultaneously moving all of the clamping levers to their releasing position, a drawline 23 is extended around all of the handle portions of the levers 15 as shown in Figure 1 and connected to two or more of the levers by means of eyes or guides 24, through which the line 23 is slidable. The line 23 is provided at one end with an eye 25 through which the other end portion of the line is passed as shown in Figure 1 so that by pulling on the end of the line 23, all of the clamping levers 15 may be simultaneously drawn inwardly and the jaws thereof moved to unclamping or releasing position. The ends of the cord or cords 19 may be connected together in any suitable manner as by lashing the same together as shown at 26 in Figure 3.

The construction hereinabove described and shown in the accompanying drawings provides an absolutely gas tight coupling or connection for the adjacent ends of flexible tube sections. Due to the construction described, the tube sections 1 and 2 may be constructed of the usual light weight fabric and the said tube ends may be connected and disconnected without loss of time, thereby making the coupling of special advantage for military purposes.

I claim:

1. In combination with tube ends, coupling means embodying a collar on the end of one tube, a ring on the end of the other tube, movable clamping means on said collar to releasably engage said ring, resilient means on said clamping means adjacent one end thereof to urge said clamping means against said ring, and releasing means on the opposite end of said clamping means.

2. In combination with tube ends, coupling means embodying a collar on the end of one tube, a ring on the end of the other tube, clamping levers on said collar each having a head on one end providing a clamping jaw for engagement with said ring, and resilient means on each of said heads of said levers to releasably retain said levers in engagement with said ring.

3. In combination with tube ends, coupling means embodying a collar on the end of one tube, a ring on the end of the other tube, clamping levers pivotally mounted on said collar each lever having a head on one end providing a clamping jaw, a common resilient means in engagement with the heads of each lever to urge the clamping jaws in contact with said ring and a common releasing means to all of said levers.

4. In combination with flexible tube ends, fluid-tight coupling means embodying a collar and seat ring between which one tube end is clamped, a cam-faced ring and complemental seat ring between which the other tube end is clamped, clamping levers pivoted on said collar and having cam-faces adapted to ride on said cam-faced ring to press the seat rings together, and resilient means connecting said levers to hold the same in clamping position.

5. In combination with tube ends, coupling means including a plurality of clamping levers on one tube end for engaging means on the end of the other tube, and a common resilient means for all of said levers to urge the same in a locking position.

In testimony whereof I affix my signature.

MATT Q. CORBETT.